3,240,723
BATTERY SEPARATORS CONTAINING SULFONAMIDE GROUPS
Henry Zuckert Friedlander, Stamford, Conn., assignor to The American Machine and Foundry Company, a corporation of New Jersey
No Drawing. Filed Jan. 13, 1961, Ser. No. 82,402
1 Claim. (Cl. 260—2.1)

This invention relates to electrically conductive plastic diaphragms, such as battery separators, and other shaped articles of manufacture for use in electrochemical processes and other separation methods. The invention also relates to synthetic polymers which are provided with negative and positive polar groups on the same macromolecule.

Various types of membranes are known for electrochemical processes in which either positive or negative polar groups are provided on a common macromolecule. Thus, both homogeneous and heterogeneous materials are known which contain either cation or anion selective groups. Moreover, it is known to make graft polymers of materials which contain both acidic and basic groups.

However, heretofore synthetic ion exchange materials containing both positive and negative groups on the same macromolecule and having a combined acidic and alkaline nominal capacity of at least 0.3 meq. per gram, have not been known. Self-supporting shaped articles in the form of sheets, films, rods, cylinders and tubes made from such "amphoteric" polymers are useful in various processes such as osmotic and electrical chemical separations.

Therefore, it is an object of this invention to provide synthetic polymeric ion exchange articles having both positive and negative groups on the same material.

It is also an object of the invention to provide a method of making ion exchange material which is both acidic and basic.

Another object of the invention is to provide a self-supporting ion excluding film of a synthetic polymer which contains both acidic and basic ion exchange groups.

Another object of the invention is to provide a diaphragm which is electrically conductive, but not ion-selective.

Another object of invention is to provide battery separators from synthetic polymers having both positive and negative ion exchange groups.

Another object is to provide electrically conductive plastic polymer materials which are preferably fusible.

Another object is to provide electrically and ion conductive spacers between ion exchange membranes.

In a preferred form of the invention a film of polyethylene is swollen in styrene monomer. The monomer is polymerized within the olefin film and ion exchange groups are substituted on the styrene component. Other substrate polymers may be used in place of polyethylene such as polymers of propylene, tetrafluoroethylene, monochlorotrifluoroethylene, vinyl chloride, and even polystyrene alone. Also natural and synthetic rubbers may be employed. These polymers may all be crosslinked by chemical means, such as divinyl benzene, or by radiation. The film forming polymers may have ion exchange groups attached directly thereto or monomers may be imbibed and copolymerized with the substrate polymer as in the case of styrene in polyethylene. Monomers include aromatic vinyl materials related to styrene, such as vinyl pyridine.

Films of the above compositions, particularly the preferred form, may be used as separators in batteries since they are conductive and may be selective in any degree from almost entirely negative to almost entirely positive. Thus a material may contain either a small or large proportion of positive groups. In the case of amino and sulfonic acid groups substituted upon polystyrene, where there is a small proportion of amino groups on a material having a large proportion of sulfonic acid groups, the amino groups act as an anti-oxidant which protects the composition against attack by such corrosive materials as chlorine, ozone, and oxygen. The materials may also be essentially neutral, for example, by containing a balanced quantity of positive and negative groups.

Chelating compositions which selectively exclude heavy metal ions, for example, may also be formed from the present invention. Films of these materials in an electric field in ionic solutions will allow sodium ions to pass more freely than ions of copper, cobalt and nickel, for example. This allows separation of these ions.

Membranes may also be made, incorporating both positive and negative groups, which are useful in osmotic separations. For example, a membrane placed as a window in a container which is submerged in sea water under ten or more atmospheres pressure will allow water to pass but will prevent salt from coming through the film. Water can then be taken from the interior of the container which is substantially salt free. For example, a pipe submerged in the sea which is sealed except for a "window" of membrane, will take in fresh water when the "window" is far enough under the surface to provide adequate external water pressure and salt will be filtered from the incoming water.

Some electrodialysis membrane stacks use a perforated supporting grid or screen between the membranes. This keeps the membranes apart and promotes turbulence. The turbulence combats polarization and scale deposits. If the screens are made from the material of this invention, or if pieces of the material are merely packed between the membranes, it is possible to scavenge ions from very dilute solutions which ordinarily have too high a resistance to be treated by electrodialysis.

The following examples illustrate the manufacture of the materials of this invention and particularly the preferred amino-sulfonamide polymeric compositions of styrene and ethylene:

*Example 1*

A five-mil thick sheet of polyethylene film of density 0.93 is irradiated by a Van de Graaff electron accelerator to a total dose of 15 megarads and then placed in filtered monomer grade styrene at 70° C. Reaction is allowed to continue until about 20 weight percent of styrene has been "grafted" onto the polyethylene. The sample is then washed in a halogenated aliphatic solvent such as ethylene dichloride at 50° C. for 20 minutes to remove the unreacted monomer. This washing step is then repeated two more times. The polyethylene-styrene graft copolymer is then placed in chloro-sulfonic acid for one hour forming the polymeric aryl sulfonyl chloride, which is also washed in ethylene dichloride.

Any free radical polymerization scheme such as heat, ultraviolet or chemicals, may be substituted for radiation. "Grafting" is only a convenient description of the matrix of polymers formed. They need not be grafted, but merely entangled or in intimate molecular mixture, as an alloy.

*Example 2*

A sample of polymeric sulfonyl chloride film as made by the procedure of Example 1 is warmed in diethylene triamine at 60° C. for two hours. After washing successively with butanone and water, the sample is allowed to equilibrate in 0.6 N potassium chloride for 20 minutes. Then its area-resistance is measured with a Wheatstone bridge conductance circuit at 1000 c.p.s. and found to be 1.9 ohm–cm.$^2$. When placed between 1.0 and 0.5

N solutions in the usual potentiometric circuit the sample displays a anionic permselectivity of 98.4 percent.

Example 3

A sample of polymeric sulfonyl chloride film from Example 1 was caused to react with piperazine by the procedure of Example 2, but was found to have a very high area-resistance, 3000 ohm-cm.$^2$, and no permselective properties. Quaternization with methyl bromide in dioxane at 50° C. for three hours, however, followed by successive washing in dioxane, water, and equilibration in 0.6 N potassium chloride gave a sample with an area-resistance of 96 ohm-cm.$^2$ and 95.3 percent anionic permselectivity.

Example 4

Samples of polymeric sulfonyl chloride made by the procedure of Example 1 were treated with a 10 percent by volume solution of ethylene diamine for varying times at 50° C. The samples were then washed with water and hydrolyzed in five percent by weight sodium hydroxide for 18 hours. Titration of the chloride form, replaced by nitrate, with silver nitrate by the usual procedure is a measure of anion-exchange capacity. Titration of the acid form of the material with sodium hydroxide is a measure of cation-exchange capacity.

| Sample Number | Amine treatment, seconds | Cation exchange capacity-meq./g. dry | Anion exchange capacity-meq./g. dry |
|---|---|---|---|
| 16 | 15 | 0.26 | 0.19 |
| 26 | 30 | 0.18 | 0.20 |
| 13 | 60 | 0.12 | 0.25 |
| 29 | 90 | 0.08 | 0.30 |
| 30 | 120 | 0.29 | 0.30 |
| 28 | 150 | 0.08 | 0.37 |
| 19 | 180 | 0.23 | 0.31 |
| 4 | 300 | 0.26 | 0.37 |

Those samples having approximately equal capacity of anion and cation exchange are good examples of amphoteric membranes.

Example 5

Three samples of polymeric sulfonyl chloride film made by the procedure of Example 1 were hydrolyzed for 18 hours in 10 percent by weight of sodium hydroxide as controls. By the usual procedures their cation-exchange capacities were measured and found to be 1.83, 1.76 and 1.65 meq./g. dry.

Three *additional* samples of the polymeric sulfonyl chloride were then separately treated at 50° C. for two hours with a solution of ethylene diamine in ethylene dichloride containing one-tenth the stoichiometric amount of amine for the first three samples. After washing with water and hydrolysis with five percent by weight of sodium hydroxide, the cation and anion exchange properties were measured as described in Example 4.

| Sample Number | Cation-exchange capacity meq./g. dry | Anion-exchange capacity meq./g. dry |
|---|---|---|
| 25 | 1.45 | 0.066 |
| 23 | 1.29 | 0.097 |
| 27 | 1.71 | 0.049 |

All six samples were then placed in water at 80° C. with a stream of air constantly bubbled through for a period of four weeks. After this oxidizing treatment, it was observed that the samples containing amino grouping were completely clear while those not containing the built-in antioxidant contained some opaque regions and blisters.

Example 6

Two samples of the polymeric sulfonyl chloride film, two inches square, as made by the procedure of Example 1 were contacted for two minutes and five minutes respectively with a solution 10 percent by volume of 3-diethylaminopropylamine in ethylene dichloride at 50° C. After washing with water they were hydrolyzed with five percent by weight solution of sodium hydroxide for 18 hours to convert the sulfonyl chloride groups to sulfonate. After copious washing the samples were dried in a vacuum oven at 80° C. to constant weight.

After drying the samples were placed in a 10 percent by volume solution of methyl iodide in petroleum ether at room temperature for 48 hours to quaternize the tertiary amino groups. After a final period of refluxing for three hours in petroleum ether at 35° C., the samples were removed, washed with water and then in six normal hydrochloric acid as the first step in measuring the cation-exchange capacity. These procedures were carried out as described in Example 4 with the following results:

| Sample | Time of treatment in amine, minutes | Cation-exchange capacity meq./g. dry | Anion-exchange capacity meq./g. dry |
|---|---|---|---|
| 21 | 2 | 0.17 | 0.12 |
| 22 | 5 | 0.18 | 0.17 |

What is claimed is:

An electrochemical diaphragm prepared by treating a sulfonated copolymer of styrene grafted onto polyethylene with an aliphatic amine to replace some of the sulfonic acid groups with sulfonamide ion exchange groups.

References Cited by the Examiner

UNITED STATES PATENTS

| | | | |
|---|---|---|---|
| 2,520,917 | 9/1950 | Dickey | 260—85.5 |
| 2,801,224 | 7/1957 | Greer | 260—2.1 |
| 2,816,154 | 12/1957 | Mendelsohn | 136—146 |
| 2,906,715 | 9/1959 | Hagge | 260—79.3 |
| 3,133,889 | 5/1964 | Hazenberg | 260—2.1 |

FOREIGN PATENTS 5,971  7/1959  Japan.

OTHER REFERENCES

Vasilev et al., Chem. Abstracts, vol. 53, 18897e (1959).

Frilette, J. Physical Chemistry, vol. 60, 435–9, April 1956.

Wiley et al., J. Am. Chem. Soc., vol. 76, pages 4519–21, Sept. 20, 1953.

WILLIAM H. SHORT, *Primary Examiner.*

HAROLD N. BURSTEIN, *Examiner.*